(12) United States Patent
Mahapatra (10) Patent No.: US 9,413,652 B2
(45) Date of Patent: Aug. 9, 2016

(54) SYSTEMS AND METHODS FOR PATH MAXIMUM TRANSMISSION UNIT DISCOVERY

(71) Applicant: Dell Products L.P., Round Rock, TX (US)

(72) Inventor: Sumanta Das Gajendra Mahapatra, Tamilnadu (IN)

(73) Assignee: DELL PRODUCTS L.P., Round Rock, TX (US)

( * ) Notice: Subject to any disclaimer, the term of this patent is extended or adjusted under 35 U.S.C. 154(b) by 334 days.

(21) Appl. No.: 13/770,715

(22) Filed: Feb. 19, 2013

(65) Prior Publication Data

US 2014/0233565 A1 Aug. 21, 2014

(51) Int. Cl.
*H04L 12/741* (2013.01)
*H04L 29/06* (2006.01)

(52) U.S. Cl.
CPC .............. *H04L 45/74* (2013.01); *H04L 69/166* (2013.01)

(58) Field of Classification Search
CPC ... H04L 2463/146; H04L 47/10; H04L 47/36; H04L 47/365; H04L 63/1441; H04L 69/166; H04L 69/22; H04L 63/146; H04L 45/74
See application file for complete search history.

(56) References Cited

U.S. PATENT DOCUMENTS 6,975,647 B2 * 12/2005 Neale et al. ................... 370/466
7,920,481 B2 * 4/2011 Winter et al. ................. 370/248
8,121,135 B2 * 2/2012 Thathapudi et al. .......... 370/401

OTHER PUBLICATIONS

McCann, J. et al., RFC1981—Path MTU Discovery for IP version 6.
Lahey, K., RFC2923—Top Problems with Path MTU Discovery.
Mathis, M., RFC4821—Packetization Layer Path MTU Discovery.
Adjusting IP MTU, TCP MSS, and PMTUD on Windows and Sun Systems.

* cited by examiner

*Primary Examiner* — Ayaz Sheikh
*Assistant Examiner* — Debebe Asefa
(74) *Attorney, Agent, or Firm* — Haynes & Boone, LLP (57) ABSTRACT

An information handling system is provided. The information handling system includes a plurality of network devices. One of the plurality of network devices is a source device and another of the plurality of network devices is a destination device. If path maximum transmission unit (PMTU) information for a path between the source device and the destination device is not known, the source device sends a PMTU send packet to the destination device, and the destination device sends a PMTU receive packet with a received PMTU value to the source device. Other associated systems and methods for PMTU discovery are also provided.

20 Claims, 8 Drawing Sheets

SYSTEMS AND METHODS FOR PATH MAXIMUM TRANSMISSION UNIT DISCOVERY

BACKGROUND

1. Technical Field

The present disclosure is related to information handling systems. In particular, embodiments disclosed herein are related to the discovery of the path maximum transmission unit in a route.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, there is increasing demand and use of networks to exchange and manage information of many different kinds. The equipment used in the exchange of information between distant locations is not homogeneous. Among the functional variations that are often encountered are different maximum transmission units (MTUs) of different routers in a path that must be traveled. Certain network devices and protocols provide for different sized MTUs. Understanding the path MTU of a given path can be useful in providing optimized transmission through that path. However, current approaches to determining path MTUs have not been entirely satisfactory.

SUMMARY

Consistent with some embodiments, there is provided an information handling system. The information handling system includes a first network device that has a plurality of ports for sending and receiving packets, in which at least one of the ports has an associated maximum transmission unit equal to a first value. The first network device also has a computer processor in communication with the plurality of ports and a memory in communication with the computer processor. The memory includes a path maximum transmission unit (PMTU) table that associates each of a plurality of destination addresses existing within the information handling system with a maximum transmission unit (MTU) value in an MTU field. Additionally, the first network device is configured to send a PMTU send packet when a particular destination address not having an associated MTU value in an associated MTU field of the PMTU table is to be accessed.

Consistent with some other embodiments, there is provided an information handling system that includes a plurality of network devices. In a particular instance, one of the plurality of network devices is a source device and another of the plurality of network devices is a destination device. If path maximum transmission unit (PMTU) information for a path between the source device and the destination device is not known, the source device sends a PMTU send to the destination device, the destination device sends a PMTU receive packet with a received PMTU value to the source device.

Consistent with some other embodiments, there is provided a method for determining a maximum transmission unit (MTU) of a path between a source network device and a destination network device. The method includes steps of transmitting a path maximum transmission unit (PMTU) send packet with an initial PMTU value from the source network device to the destination network device and transmitting a PMTU receive packet from the destination network device to the source network device, the PMTU receive packet including a received PMTU value. The method further includes a step of updating a PMTU table on the source network device with the received PMTU value included in the PMTU receive packet.

These and other embodiments will be described in further detail below with respect to the following figures.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Additionally, some embodiments of information handling systems include non-transient, machine-readable media that include executable code that when run by a processor, may cause the processor to perform the steps of methods described herein. Some common forms of machine-readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 1:
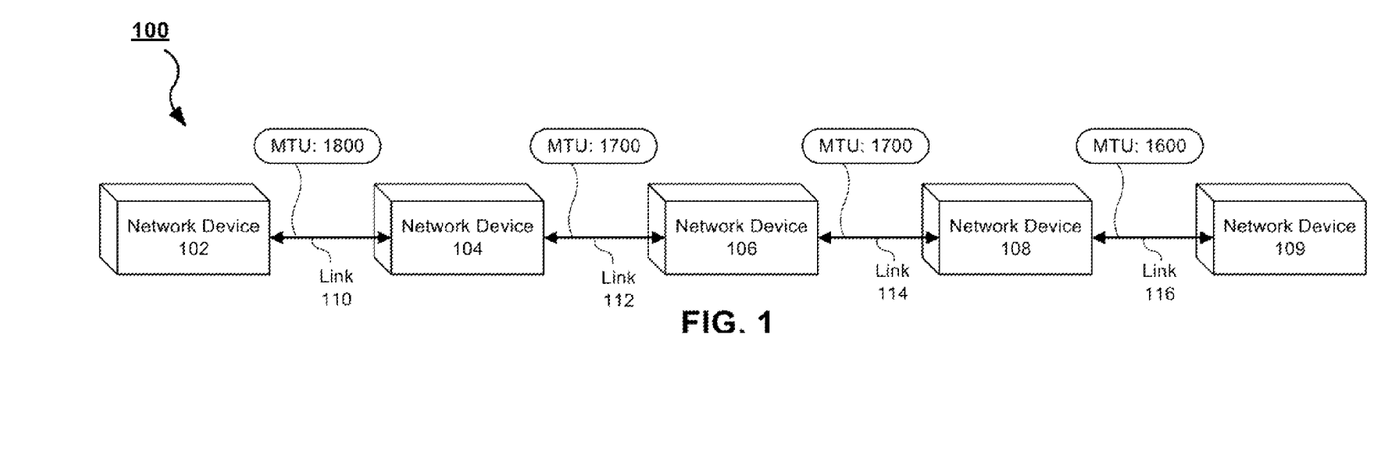
FIG. 1 is a diagram of an information handling system that includes a plurality of links between network devices, the links having different maximum transmission units (MTU).

FIG. 1 depicts an information handling system 100 that includes a plurality of network devices. As illustrated, the plurality of network devices includes a network device 102, a network device 104, a network device 106, a network device 108, and a network device 109. In some embodiments, network devices 102, 104, 106, 108, and 109 are Layer 2 devices. However, as depicted the network devices are Layer 3 routers. The plurality of network devices is connected by a plurality of links. Each of the links can be described in terms of a maximum transmission unit (MTU). The MTU of a link describes the largest size data packet that can transmitted over the link at a single time. The MTU of a link can be influenced by the communication interfaces of the ports, the protocols running over the ports, and other factors. In general, a link with a larger MTU can provide greater efficiency as the amount of data contained in a packet relative to the header or headers of the packet increases. However, there are drawbacks to large MTU sizes as well.

In information handling system 100, a link 110 connects a port on the network device 102 to a port on the network device 104. Similarly a link 112 connects network device 104 to a network device 106, a link 114 connects network device 106 to network device 108, and a link 116 connects network device 108 to a network device 109. Each of links 110, 112, 114, and 116 has an associated MTU that characterizes the link. For instance link 110 has an MTU of 1800 bytes, links 112 and 114 both have MTUs of 1700 bytes, and link 116 has an MTU of 1600 bytes, the smallest of the links in information handling system 100.

In Internet Protocol Version 4 (IPv4) the variations in MTU are often handled using fragmentation, splitting a single larger packet into more than one smaller packet. So when a packet is sent from network device 102 to network device 109, the packet may be fragmented, split into two or more packets by network device 104, with the fragmented packets then travelling to network device 106. Since the MTU of link 114 is the same as that of 112, no fragmenting occurs. But, depending on how the packet is fragmented, one of the fragmented packets may be fragmented yet again by the network device 108 as it prepares to transmit the packet over link 116, which has an MTU of 1600 bytes.

Alternatively, a packet with a size exceeding the MTU of a particular device is simply dropped and a responsive control packet, an Internet Control Message Protocol (ICMP) packet, is sent to the source, indicating the sent packet was dropped and also indicating the MTU of the particular device. For example, the network device 102 sends an 1800-byte packet over link 110 to network device 104. This packet size is equal to the MTU of link 110; however it is greater than the MTU of link 112, 1700 bytes. Since the packet is too big to send without fragmenting, the network device 104 sends an ICMP packet back to network device 102 and drops the packet it received. The ICMP packet indicates the MTU of link 112 so that network device 102 can appropriately resize the packet when it resends the packet. Given this response, the process is repeated again, with network device 108 dropping the packet and sending an ICMP packet indicating that the MTU of link 116 is 1600 bytes.

While Internet Protocol Version 6 (IPv6) does not support fragmentation as IPv4 did, it does support ICMPv6 messages to indicate that a packet is too big to pass through a device in the transmission path. These ICMPv6 messages are called "Packet Too Big" messages and are sent and operate similar to the ICMP packets discussed above in connection with IPv4. The repeated dropping of packets and sending of ICMPv6 "Packet Too Big" messages adds delay into information handling system 100. This delay is seen more acutely in FIG. 2.

Figure 2:
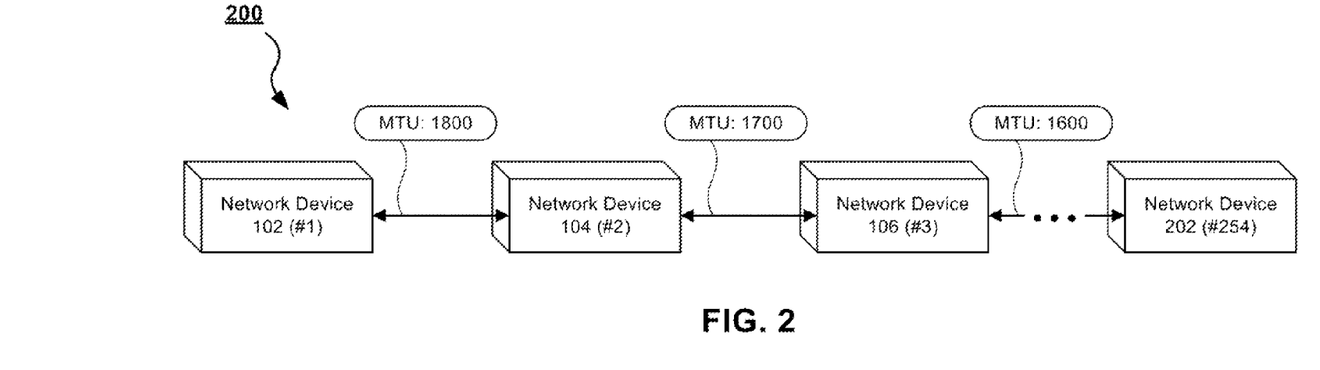
FIG. 2 is a diagram of an information handling system including a transmission path through a plurality of network devices.

FIG. 2 depicts an information handling system 200 that includes significantly more network devices than are illustrated in the information handling system 100 of FIG. 1. As depicted, information handling system 200 includes a network device 102, a network device 104, a network device 106, and a network device 202. The depicted embodiment of information handling system 200 includes 254 network devices, but may include any number of network devices. The MTUs of the first three links, links 110, 112, and 114 are included as 1800, 1700, and 1600 bytes, respectively. The MTUs of the other links in information handling system 200 increase continually with proximity to the network device 202. However, IPv6 includes a minimum size of 1280 bytes. The links of information handling system 200 do not go below this threshold.

In some embodiments of information handling system 200, ICMPv6 "Packet Too Big" messages are sent at every network device include network devices 102 and 202. The messages are sent when the packet sent from network device 102 is dropped. Thus, in order to establish the path MTU (PMTU), the lowest MTU of any link between network device 102 and network devices 202, network device 102 resends a packet 253 times. Additionally, in some embodiments there is a delay before sending the next packet. This "retransmission time" can be as much as a second. Given the number of network devices in information handling system 200, the total delay could add more than four minutes of delay.

Figure 3:
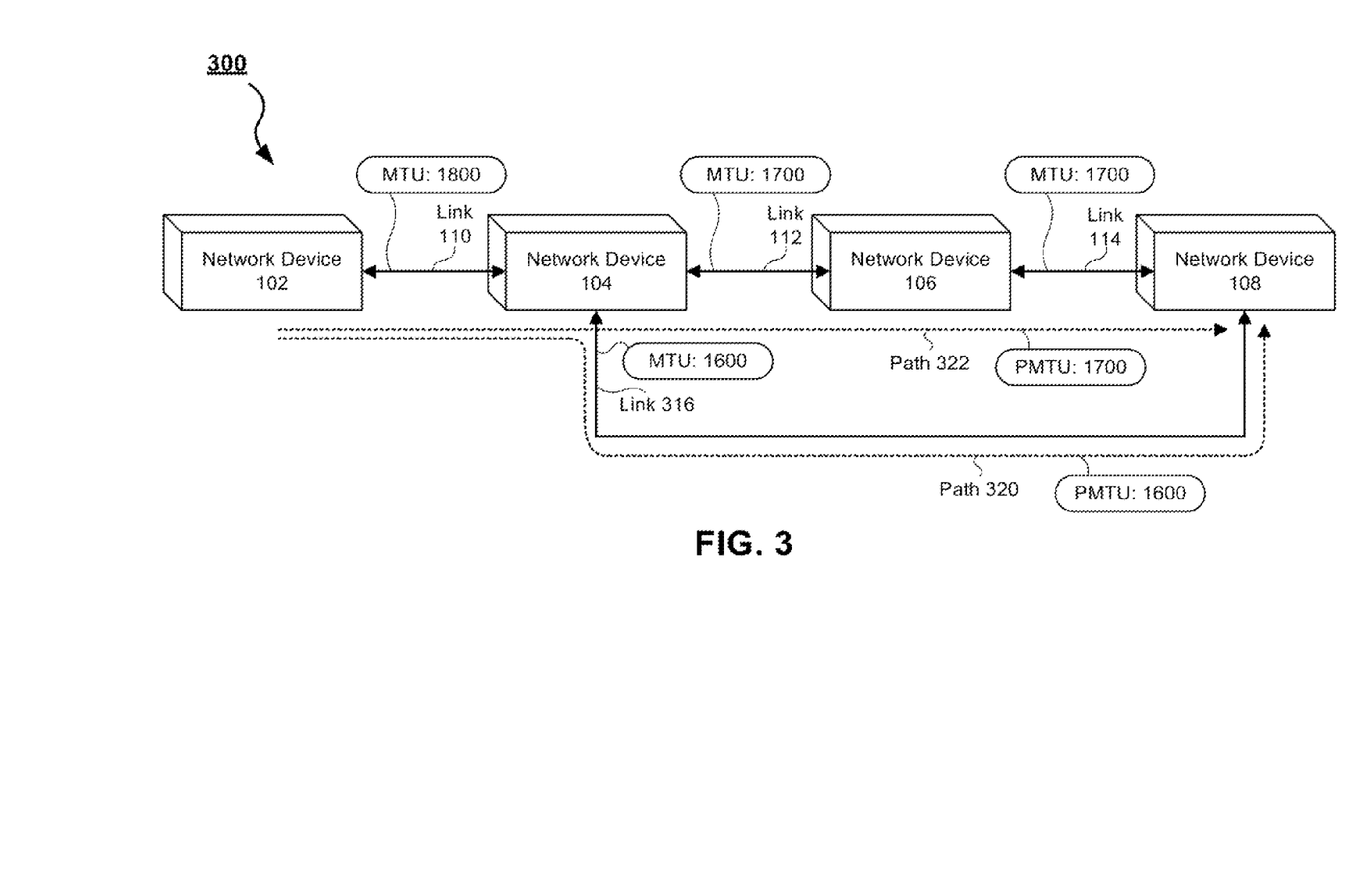
FIG. 3 is a diagram of an information handling system that includes an alternate path having the lowest MTU.

FIG. 3 depicts an information handling system 300 that includes a plurality of network devices. As illustrated, the plurality of network devices includes a network device 102, a network device 104, a network device 106, and a network device 108. In information handling system 300, a link 110 connects a port on the network device 102 to a port on the network device 104. Similarly a link 112 connects the network device 104 to a network device 106, while a link 114 connects the network device 106 to network device 108. This is similar to information handling system 100 of FIG. 1. Additionally, a link 316 is depicted that connects the network device 104 directly to the network device 108. Each of links 110, 112, 114, and 316 has an associated MTU that characterizes the link. For instance link 110 has an MTU of 1800 bytes, links 112 and 114 both have an MTU of 1700 bytes, and link 316 has an MTU of 1600 bytes, the smallest of the links in information handling system 300.

When a packet is to be sent from network device 102, acting as a source device, with network device 108 as the destination device, the maximum size of the packet depends on the path by which it is sent. As depicted, the most efficient path may be considered to be the path that includes links 110 and 316, path 320. This path includes two hops, rather than the three included in a path 322, the path with links 110, 112, and 114. But the PMTU of path 120 is set by link 316 with its MTU of 1600 bytes, rather than path 122's PMTU of 1700 bytes set by links 112 and/or 114.

As depicted, path 320 is a preferable to path 322, and therefore is used to transmit packets from network device 102 to network device 108. In the event that link 316 fails, the information handling system 300 may switch from path 320 to path 322 for transmission from network device 102 to network device 108. However, the network device 102 has been configured with the PMTU of 1600 bytes for transmissions with network device 108 as the destination. Therefore, information handling system 300 may fail to utilize the full capacity of path 322, which has a PMTU of 1700 bytes.

A reliable PMTU discovery (PMTUD) process may help determine and maintain PMTU information so as to optimize performance of information handling systems. Due to numerous causes, the ICMP messages often fail to reach the source network device, leading to PMTUD failures. Some vendors have suggested disabling PMTUD rather than deal with the problems, which can also present security risks. Disabling PMTUD poses less of a problem in IPv4 networks than in IPv6 networks, because IPv4 networks can fall back on fragmentation.

Figure 4A:
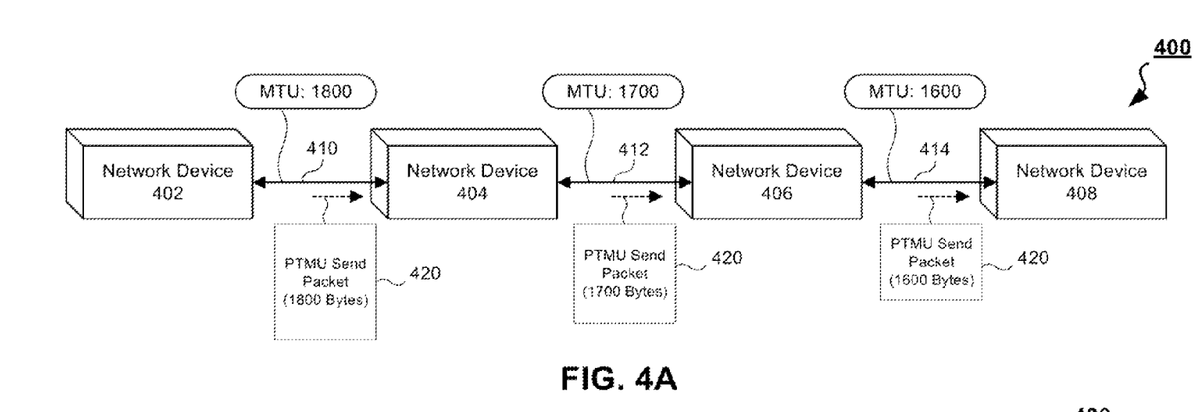
FIG. 4A is diagram of a packet traversing an information handling system for path maximum transmission unit discovery (PMTUD) according an embodiment.
Figure 4B:
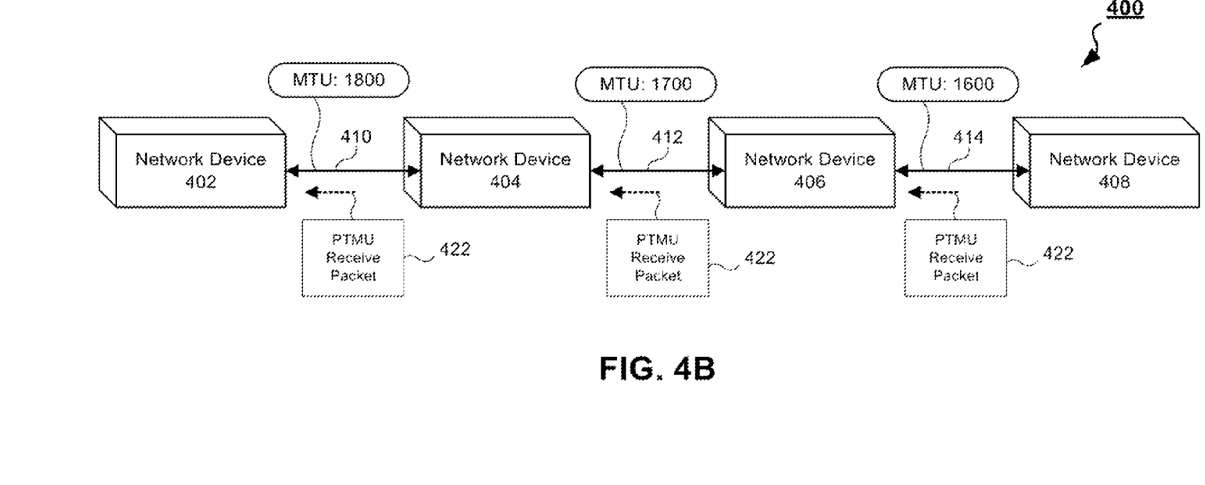
FIG. 4B is a diagram of a PMTU send packet returning through an information handling system according to an embodiment of the present disclosure.
Figure 4C:
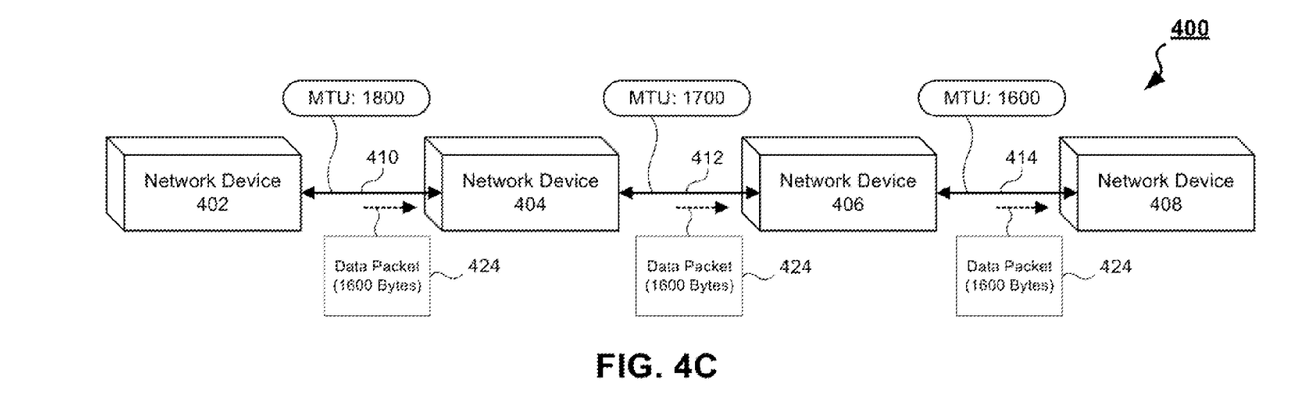
FIG. 4C is a diagram of an information handling system implementing a PMTUD system according to an embodiment of the present disclosure.

FIG. 4A depicts an information handling system 400 that is similar in many ways to information handling systems 100, 200, and 300 of FIGS. 1, 2, and 3, respectively. Information handling system 400 includes a plurality of network devices. As illustrated, information handling system 400 includes network devices 402, 404, 406, and 408 connected by links 410, 412, and 414 as shown. Other embodiments include more or fewer network devices. As depicted, each of the plurality of network devices is a router, but in some embodiments, network devices 402 and/or 408 are hosts. Network device 402 includes a table of PMTU information, associating destination addresses with PMTU values. FIGS. 4A, 4B, and 4C depict the gathering and application of PMTU information according to an embodiment.

In FIG. 4A, a connected host (not depicted) directs network device 402 to send a packet to network device 408. The network device 402 checks the table of PMTU information which does not include a PMTU value in the PMTU field associated with the address of the network device 408. The network device 402 acquires PMTU information by forming and sending a PMTU send packet 420. An embodiment of such a packet is presented further below in FIG. 7. In the depicted embodiment, the PMTU send packet 420 is created by appending a PMTU header onto the packet to be sent. The PMTU header includes a PMTU value field. Since the table of PMTU information does not contain an entry for the destination of network device 408, the network device 402 sends the packet out sized according to a value associated with the link 410, the known first hop in the path. This value associated with the known first hop is inserted into the PMTU value field before the PMTU send packet 420 is sent out.

The network device 404 receives the PMTU send packet 420, and determines from the PMTU header that PMTU information is being requested. The network device 404 also examines the header to determine the destination address of the packet, which in this example is network device 408. The network device 404 checks a table stored in memory that includes MTU information for link 412, which connects network device 404 to its neighbor, network device 406. The table indicates that the MTU of link 412 is 1700 bytes, 100 bytes smaller than the current size of the PMTU send packet 420. The network device 404 inserts the MTU value of link 412 (1700 bytes) into the PMTU value field and removes at least 100 bytes of data from the PMTU send packet 420 before sending the back over link 412 to the network device 406.

The network device 406 responds to the PMTU send packet 420 similarly to network device 404. It recognizes the PMTU send packet 420 as a PMTU send packet from the PMTU header thereof, determines the MTU value of the link to the next hop (in this case, the MTU of link 414 is 1600 bytes) toward its destination, inserts the determined MTU value (1600 bytes) into the PMTU header before resizing the PMTU send packet 420 by a decrease of at least 100 bytes and sending it to the network device 408. In general, a network device replaces or updates the MTU value included in the PMTU send packet if the MTU value is of the next hop link is smaller than the MTU value already indicated in the PMTU send packet. In embodiments of information handling system 400 that run the IPv6 protocol, the PMTU send packet 420 is not resized below 1280 bytes.

FIG. 4B illustrates the response of information handling system 400 after the network device 408, the destination device, receives the PMTU send packet 420 from network device 406. The network device 408 receives the PMTU send packet 420 and identifies it from its PMTU header as a PMTU send packet. As received by the network device 404, the value in the PMTU value field is the lowest MTU of all the links traversed to arrive at the destination device. In this example, a 1600-byte PMTU value is included in the PMTU send packet 420. This is the PMTU value that is to be communicated back to the network device 402, the source device.

To communicate this, the network device 408 makes a PMTU receive packet 422 that includes a PMTU header that indicates it is a PMTU receive packet and includes the PMTU value received from the PMTU send packet 420. The network device 408 sizes the PMTU receive packet 422 to be no larger than the PMTU value received. In this example, the PMTU receive packet 422 is 1600 bytes. Since the PMTU receive packet 422 is sized according to the PMTU of the transmission path between the destination network device 408 and the source network device 402, the packet is sent without resizing and without altering the PMTU value included in the header. In some embodiments, the PMTU receive packet 422 is 1280 bytes, the minimum packet size in the IPv6 standard.

FIG. 4C illustrates the use of the PMTU information in information handling system 400. When network device 402 receives the PMTU receive packet 422, from the header it knows that this is a PMTU receive packet. Using the source address of the packet, network device 408, and information from the header, the network device 402 extracts the PMTU value of 1600 bytes and inserts it into the appropriate location in the table of PMTU information. A data packet is then sent being sized according to the PMTU value so that the packet is not dropped for being too large and is sent with as much data as possible. This data packet, data packet 424, is sent from network device 402 to network device 404 to network device 406 and, finally, to its destination, network device 408. The data packet 424 does not need to be resized by network devices 404 and 406 in order to reach network device 408 intact due to the PMTU discovery system of FIGS. 4A and 4B.

The PMTUD system of information handling system 400 can also adapt to changes in the path between a source device and a destination device. In some embodiments, if an additional PMTU receive packet is received by network device 402 that include network device 402 as the destination, the PMTU value included in the additional PMTU receive packet is compared with the PMTU value already included in the table of PMTU information. The additional PMTU receive packet may be a PMTU confirmation packet or responsive to a PMTU send packet sent to a multicast address. If the PMTU value of the additional PMTU receive packet is smaller than the PMTU value in the table, the PMTU value in the table is replaced with the smaller value. If the PMTU value of the additional PMTU receive packet is larger than the PMTU value in the table, the source device waits until a PMTU confirmation timer is expired. In some unicast embodiments, the source device may not wait. If no PMTU update is received during that period that contains the PMTU value currently stored in the table of PMTU information, and no other conflicting information is received, the table is updated with the larger PMTU value received in the additional PMTU receive packet.

Figure 4D:
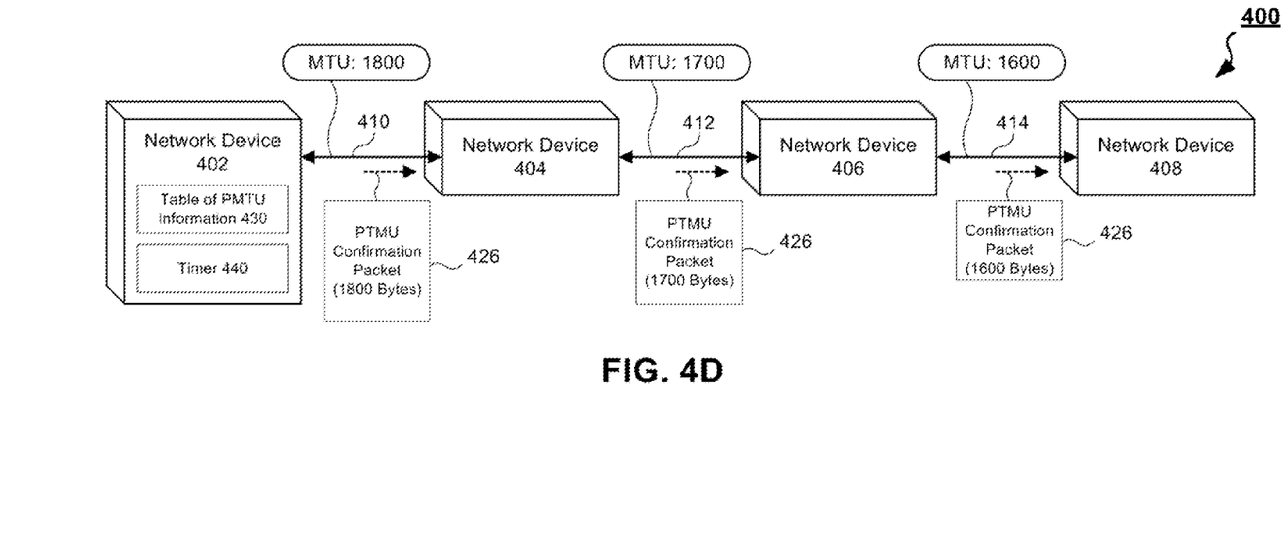
FIG. 4D is a diagram of an information handling system implementing a PMTUD system with a confirmation packet according to an embodiment of the present disclosure.

FIG. 4D illustrates the sending of a PMTU confirmation packet 426. PMTU confirmation packets, like the PMTU confirmation packet 426, may be sent on a periodic basis, determined by a timer 440, to account for any changes that may occur in an information handling system, like those discussed in connection with information handling system 300 of FIG. 3. For example, the timer 440 indicates a lower period of about a minute in some embodiments. Network device 402 may form a PMTU confirmation packet 426 by adding a PMTU header to a data packet. The size of the PMTU confirmation packet 426 is determined by the known MTU of the current next hop, in this example the MTU of link 410, rather than the PMTU value associated with the destination in a table of PMTU information. If a PMTU receive packet is returned from the destination in response to the PMTU confirmation packet 426 with a lower PMTU value 430, then the original data packet is resent so as to avoid the loss of data. The PMTU receive packet responsive to the PMTU confirmation packet 426 is similar to PMTU receive packet 422 of FIG. 4B.

While the depicted embodiment of information handling system 400 includes a path with four network devices, other embodiments may contain more or fewer. In some embodiments, the MTUs of links may increase, decrease, or remain the same between two links. Where the MTU of a second encountered link is larger or the same as the MTU of a first encountered link, the PMTU value is not updated. However, when the MTU of the second encountered link is smaller, the PMTU value is updated.

Additionally, in some embodiments, the integrity of the PMTUD system and process can be guarded by the inclusion of authentication data. The network device 402 inserts authentication data into the header of PMTU control packets, i.e. PMTU send packets and PMTU confirmation packets. The authentication data is a cryptographically auto-generated value, and can maintained in relation to a particular destination, so that all PMTU control packets sent to a particular destination use the same authentication data. Alternatively, authentication data may be uniquely generated each time a PMTU control packet is formed. When a destination device, such as the network device 408 forms a PMTU receive packet, it includes the authentication data in the PMTU header. When the PMTU receive packet arrives at the source device, the authentication data is examined to ensure that the information is a legitimate response to the PMTU send packet.

Figure 5:
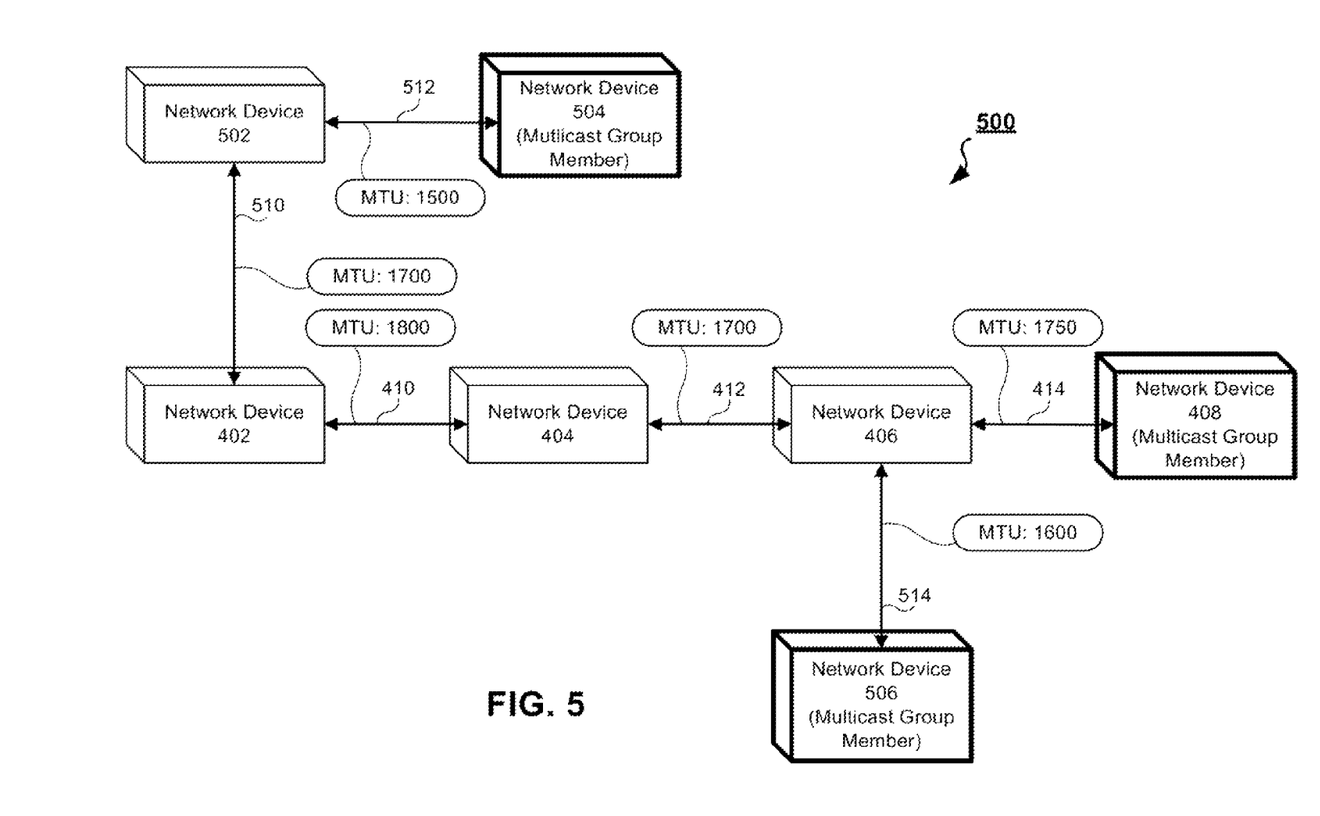
FIG. 5 is a diagram of an information handling system implementing a PMTUD system in a multicast context according to an embodiment of the present disclosure.

FIG. 5 depicts the operation of the PMTUD system in a multicast context of information handling system 500. Information handling system 500 is similar to information handling system 400 of FIGS. 4A, 4B, and 4C, but it further includes additional network devices 502, 504, and 506. As depicted, network device 502 is connected by a link 510 to the network device 402. The network device 506 is connected to the network device 406 by a link 514. In turn, the network device 504 is connected by a link 512 to the network device 502, which in the depicted embodiment is a server.

As illustrated, network device 504, 506, and 408 are members of a multicast group identified by a multicast address. Some embodiments contain more than one multicast groups. If network device 504 is directed to send a packet to the multicast address, the network device 504 checks its table of PMTU information to determine how to optimally size the packet. Information handling system 500 is configured to use a PMTUD system like that described above in connection with FIGS. 4A, 4B, and 4C. The network device 402 sends out a PMTU send packet on all of its ports associated with the multicast address. In the depicted embodiment, the PMTU send packet is sent out over links 510 and 410.

As illustrated in FIG. 5, links 510 and 410 have different MTUs, 1700 bytes and 1800 bytes, respectively. In the depicted embodiment, the current link determines the size of the PMTU send packet. Thus as illustrated, the PMTU send packet sent to network device 404 is 1800 bytes, while the PMTU send packet sent to network device 502 is 1700 bytes. In some embodiments, differences in the levels are resolved prior to sending the PMTU packets to the members of a multicast address. In such embodiments, the smallest of the two depicted next-hop MTUs can be utilized. In information handling system 500, packets to network devices 502 and 402 would be 1700 bytes, the limit provided by link 510. Similar decision processes may be used at network device 406, when again more than one multicast group member is a single hop away.

Eventually, each of network devices 504, 408, and 506 receives the PMTU send packet. Due to differences in the paths to each of these network devices, the PMTU value included in the PMTU header of each packet is different. The PMTU of the path to the network device 504 is 1500 bytes, limited by link 512; 1700 bytes on the path to the network device 408; and 1600 bytes on the path to network device 506. Each of the network devices 504, 506, and 408 responds to the PMTU send packet with a PMTU receive packet, so the network device 402 receives a PMTU receive packet from each destination device addressed by the multicast address.

The network device 402 receives three PMTU receive packets each indicating a different PMTU value. The smallest PMTU value is selected and included in table of PMTU information where it is associated with the multicast address. Thereafter, each time network device 402 is directed to send a packet to the multicast address, the packets to all destinations are size at 1500 bytes to help ensure that no packet is dropped for exceeding the MTU of any link.

Figure 6:
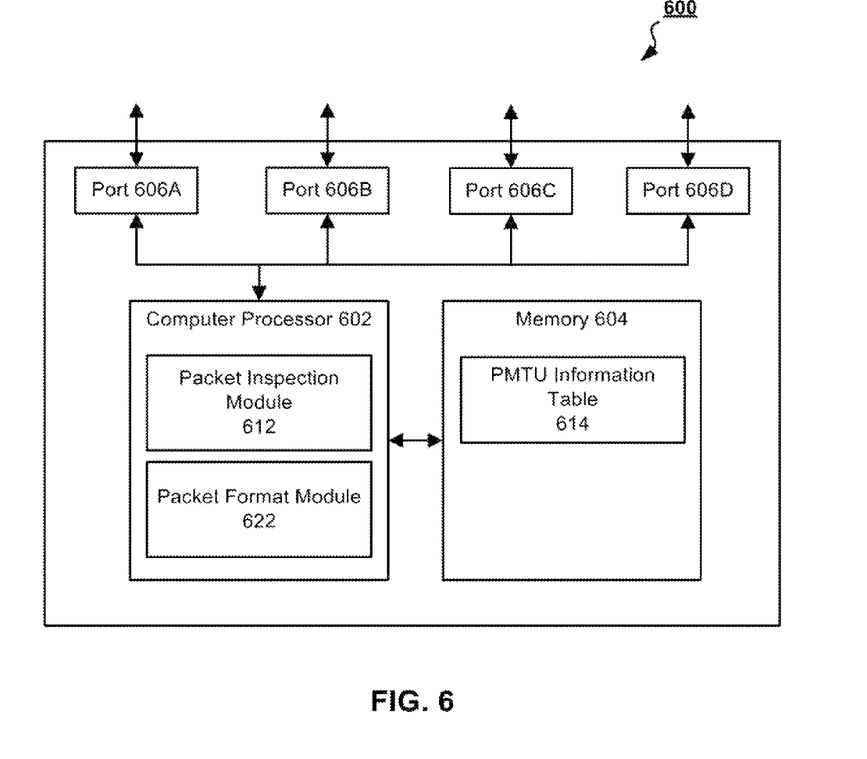
FIG. 6 is a functional diagram of a network device such as may be used to implement PMTUD according to an embodiment of the present disclosure.

FIG. 6 is a functional diagram of an information handling system or device 600 that may be useful in understanding how the network devices of information handling systems 400 and 500 are implemented. Information handling device 600 may be a server, a switch, a router, and/or a host. Hereinafter, information handling device 600 is referred to as network device 600. Many other features, modules, and components are included in embodiments of the network device 600, only some of which are discussed herein.

Network device 600 includes a computer processor 602 in communication with a memory 604 and a plurality of ports 606A-D. While depicted as a single processor in FIG. 6, computer processor 602 may be a plurality of computer processors functioning together to provide various capabilities and features. In some embodiments, computer processor 602 and memory 604 are combined in an application specific integrated circuit (ASIC). In the depicted embodiment, memory 604 is a solid-state memory component. The computer processor 602 is in communication with a plurality of ports. As depicted, network device 600 includes four ports 606A, 606B, 606C, and 606D, while other embodiments include more or fewer ports.

Computer processor 602 provides a number of functional modules, including a packet inspection module 612 and a packet format module 622. In some embodiments, each of the functional modules may be provided by an individual ASIC, while in others the modules are provided by a combination of hardware and software sub-components. The packet inspection module 612 is configured to read packets and extract information such as a PMTU value in a PMTU header, other destination and source information in the header or headers of packets, as well as payload data.

Some or all of the inspected information can be sent to memory 604 and stored in the PMTU information table 614. The PMTU information table 614 includes a plurality of fields relating PMTU values to destination addresses. Other information accessible to the computer processor 602 includes port assignments and next hop MTUs.

The network device 600 also includes a packet format module 622 that can form and format packets in a variety of ways. For example, the packet format module 622 adds PMTU header information to data packets to create PMTU send packets, PMTU confirmation packets, and PMTU receive packets. The packet format module 622 can also copy and resize packets to allow them to be transmitted over a link with an MTU smaller than that on which they are received. In short, network device 600 is capable of acting as the destination devices, network devices, and intermediate devices described in FIGS. 4 and 5.

Figure 7:
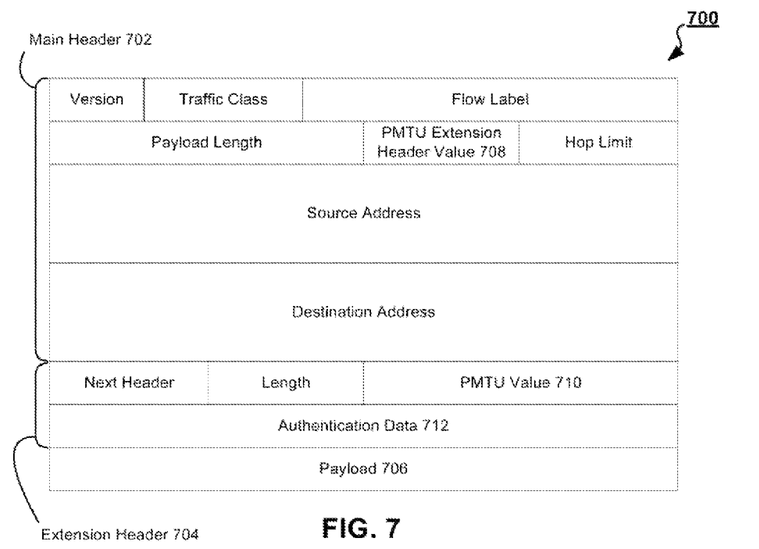
FIG. 7 is a diagram of a PMTU send packet sent to request PMTU information.

FIG. 7 is a diagram of a header of a PMTU send packet 700. The depicted embodiment of the PMTU send packet 700 is similar in many ways to a standard IPv6 packet. The packet 700 includes a main header 702, in this embodiment an IPv6 header, and an extension header 704, along with a payload 706. The main header 702 includes fields for version, traffic, class, flow label, next header, and hop limit, as well as source and destination address fields. As depicted, the next header field of the main header is filled with a PMTU extension header value 708 that informs the receiving network device is associated with the extension header 704, which is a PMTU extender header. In the depicted embodiment, actual numerical value used in the next header field as the PMTU extension header value 708 is 143, though in other embodiments, other numbers not currently defined by the IPv6 standard may be used. By designating a single PMTU extension header value, such as 143, to be used, multiple makes of hardware may be used interchangeably while maintaining the PMTUD process.

The PMTU extension header 704 includes a PMTU value 710. During the process of PMTU discovery, whenever a lower MTU value is encountered, the PMTU value 710 is replaced with that lower MTU value as described above. In the depicted embodiment, the PMTU value 710 is the known value of first hop link. The PMTU extension header 704 further include authentication data 712 as discussed above in connection with the information handling system 400 of FIGS. 4A, 4B, and 4C.

Figure 8:
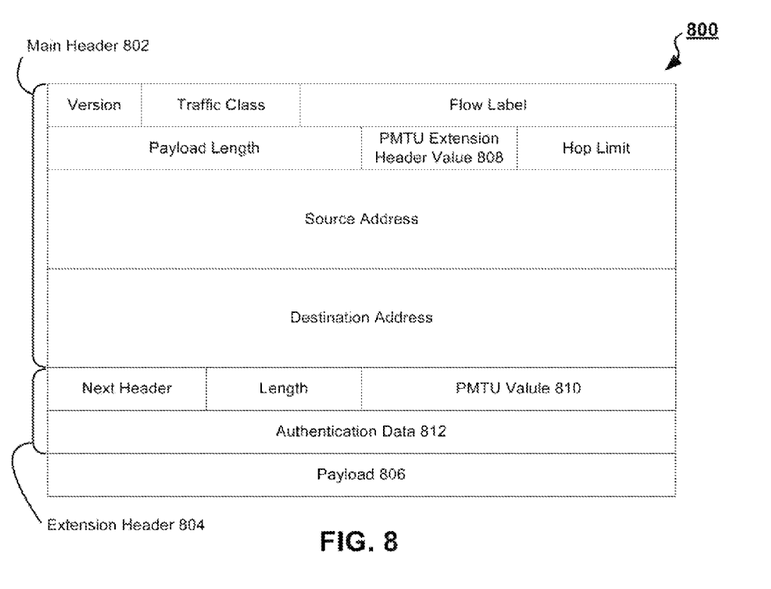
FIG. 8 is a diagram of PMTU receive packet sent to deliver PMTU information

FIG. 8 is a diagram of the header of a PMTU receive packet 800. The depicted embodiment of the PMTU receive packet 800 is similar to the PMTU send packet 700 of FIG. 7 in many respects, such as including a main header 802 conforming to the IPv6 standard. For explanatory purposes, the PMTU receive packet 800 is discussed as if it is responsive to the PMTU send packet 700 of FIG. 7. In addition to the main header 802, the PMTU receive packet includes a PMTU extension header 704 and a payload 706. The main header 802 includes the same fields as the main header 702 of FIG. 7. The source address and destination address of the PMTU send packet 700 are used as the destination address and the source address, respectively, of the PMTU receive packet 800 during normal operation of the PMTU discovery system. A PMTU extension header value 808 is included to indicate to network devices that the extension header 804 is a PMTU extension header. Again, the value of 143 is used, but another available value may be used in other embodiments. However, the use of a single value in all implementations may ensure interoperability. The extension header 804 includes a PMTU value 810. Unlike any PMTU value in a PMTU send packet, PMTU value 810 is the actual PMTU value of the path between the source address and the destination address that is to be saved into the table of PMTU information for future use. To improve security, the extension header 804 also includes authentication data 812, which corresponds to the authentication data 712. In some embodiments, the authentication data 812 is the same as the authentication data 712, while in other embodiments, no authentication data is included in either extension header 704 or 804.

Figure 9:
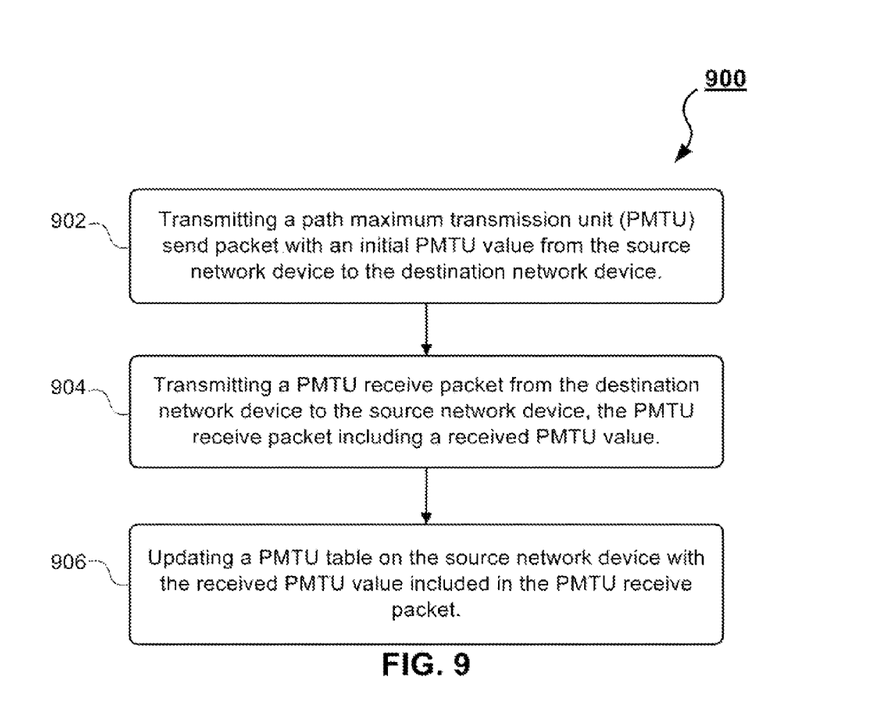
FIG. 9 is a flowchart of a method for determining a maximum transmission unit (MTU) of a path between a source network device and a destination network device For clarity of discussion, elements having the same designation in the drawings may have the same or similar functions. The drawings may be better understood by referring to the following Detailed Description.

FIG. 9 is a flow chart of a method 900 for determining an MTU of a path between a source network device and a destination network device. As depicted in FIG. 9, the method 900 includes a plurality of steps. In step 902, a source network device transmits a PMTU send packet with an initial PMTU value from the source network device to the destination network device. In step 904, the destination network device transmits a PMTU receive packet from the destination network device to the source network device. The PMTU receive packet includes a received PMTU value. This received PMTU value is included in a PMTU table on the source network device when it is updated after source network device receives the PMTU receive packet, in step 906.

In order to better explain how method 900 may operate, an example using information handling system 400 of FIGS. 4A, 4B, and 4C, the network device 600 of FIG. 6, and the PMTU send and receive packets of FIGS. 7 and 8. The network device 402 is directed to send a packet to network device 408, both of which have at least the features of the network device 600 of FIG. 6. The computer processor 602 of network device 402 checks the PMTU information table 614 to see whether there is PMTU information associated with the address of network device 408. If there is not, the network device 402 creates a PMTU send packet 700, and sets an initial PMTU value 710 therein to known next-hop MTU before sending it out on one of its ports 606A-D (step 902).

The PMTU send packet 700 arrives at the network device 408, which uses its packet inspection module 612 to determine that it is a PMTU send packet which should be responded to with a PMTU receive packet. The network device 408 uses its packet inspection module 612 to extract the PMTU value 710 from the PMTU send packet 700 and the packet format module 622 to insert the received PMTU value into a PMTU send packet 800. This received PMTU value has been set and potentially reset by the network devices 404 and 406 to indicate the PMTU of the total path before arriving at network device 408. The network device 408 then transmits the PMTU receive packet 800 through network devices 406 and 404 to 402, with the received PMTU value in the extension header 804 of the packet (step 904). The network device 402 extracts the received PMTU value from the PMTU receive packet 800 and updates the PMTU information table 614 stored in memory 604 of network device 402.

Many variations of method 900 are within the scope of this disclosure. In some embodiments, additional steps may occur before, after, and in between steps 902, 904, and 906 as depicted. For example, some additional steps may include receiving the PMTU send packet from the source network device at an intermediate network device and resizing the PMTU send packet so that it is as small as or smaller than an MTU of a next link in the path to the destination network device. This intermediate network device may transmit the resized PMTU send packet to the source network device. In some embodiments, the PMTU send packet is formed by adding a PMTU header including an initial MTU value to a data packet. This initial MTU value is generally the known MTU of the next hop link. Additionally, in embodiments in which a packet is to be sent from the source network device to a multicast address, the source network device may select a lowest MTU value from a plurality of received PMTU values received from a plurality of destination network devices associated with a multicast address.

In order to provide an additional level of security, authentication data is included in some embodiments. For example, authentication data is included in the PMTU send packet before transmitting it to the destination device. The same authentication data in then included in the PMTU receive packet before transmitting it from the destination network device to the source network device. While in some embodiments the authentication data included in the PMTU send packet and the PMTU receive packet is the same, in other embodiments the authentication data included in the PMTU receive packet corresponds to authentication data included in the PMTU send packet without being identical. The source network device checks the authentication data included in the PMTU receive packet with the authentication data included in the PMTU send packet.

Some embodiments of the method 900 also include steps that are part of a PMTU confirmation process. The PMTU confirmation process is used to maintain the PMTU information table. Changes may occur in the information handling system that alter the PMTU seen between source and destination network devices. The source network device may form a PMTU confirmation packet by adding a PMTU header to a data packet and then transmit the PMTU confirmation packet to the destination network device periodically. The destination network device responds by transmitting a PMTU receive packet to the source network device.

Some embodiments of information handling systems 400 and 500 include tangible, non-transient, machine-readable media that include executable code that when run by a processor, such as computer processor 602 of network device 600 in FIG. 6, may cause the processor to perform the steps of method 900 as described above. Some common forms of machine-readable media that may include the steps of method 900 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. The machine-readable media may be memory 604 of FIG. 6.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A first network device in an information handling system, the first network device comprising:
   a plurality of ports for sending and receiving packets, at least one of the ports having an associated maximum transmission unit equal to a first value;
   one or more processors in communication with the plurality of ports; and
   a memory in communication with the one or more processors, the memory including a path maximum transmission unit (PMTU) table that associates each of a plurality of destination addresses with a maximum transmission unit (MTU) value in an MTU field; and
   wherein the first network device is configured to:
      send a PMTU send packet comprising a first MTU value based on a MTU size for a first immediate hop of a transmission path and a data packet to the destination address when the destination address for the data packet does not have an associated MTU value in an associated MTU field of the PMTU table; and
      resend the data packet when a PMTU response is received comprising a second MTU value smaller than the first MTU value.

2. The first network device of claim 1, wherein the PMTU send packet is sent using Internet Protocol version 6 (IPv6) and includes the first value in a PMTU header of the PMTU send packet.

3. The first network device of claim 1, wherein the PMTU send packet is decreased in size by at least one intermediate network device before reaching the destination address.

4. The first network device of claim 1, wherein the first network device is configured to update the associated MTU field upon receipt of a PMTU receive packet from a second network device, the second network device having the destination address.

5. The first network device of claim 1, wherein the PMTU send packet includes authentication data.

6. The first network device of claim 1, wherein the destination address is a multicast address associated with a plurality of destination network devices, each of the plurality of destination network devices generating a PMTU receive packet in response to the PMTU send packet, each PMTU receive packet including a third MTU value, the first network device being configured to update the PMTU table to include a lowest MTU value of the third MTU values in the associated MTU field.

7. An information handling system comprising:
- a first network device, the first network device being a source device;
- a second network device, the second network device being a destination device; and
- at least one intermediate network device, the source device, the destination device, and the at least one intermediate network device being part of a plurality of network devices, wherein:
  - if path maximum transmission unit (PMTU) information for a path between the source device and the destination device is not known, the source device sends a PMTU send packet with a first MTU value, the first MTU value based on a first immediate hop of the path, with a data packet to the destination device, the destination device sends a PMTU receive packet with a received PMTU value to the source device and the source device resends the data packet when the received PMTU value is below the first MTU value.

8. The information handling system of claim 7, wherein the source device updates a table of PMTU information with the received PMTU value.

9. The information handling system of claim 8, wherein the PMTU send packet includes an initial PMTU value that is larger than the received PMTU value.

10. The information handling system of claim 7, wherein the PMTU send packet includes sent authentication data.

11. The information handling system of claim 10, wherein the PMTU receive packet includes received authentication data and the source device updates a table of PMTU information with the received PMTU value if the received authentication data corresponds to the sent authentication data.

12. The information handling system of claim 7, wherein the source device periodically sends a PMTU confirmation packet to the destination device, the destination device responding with a corresponding PMTU receive packet.

13. The information handling system of claim 7, further comprising a multicast address that is an address for a plurality of destination network devices, the plurality of destination network devices including the destination device; and wherein:
- the source device is configured to send a respective PMTU send packet to each of the plurality of destination network devices, each destination network device of the plurality responding by sending a respective PMTU receive packet that includes a second MTU value, and to select a lowest MTU value of the second MTU values.

14. A method for determining a maximum transmission unit (MTU) of a path between a source network device and a destination network device, the method comprising:
- transmitting a data packet with a path maximum transmission unit (PMTU) send packet with an initial PMTU value, the initial PMTU value based on a first immediate hop of a transmission path, from the source network device to the destination network device;
- transmitting a PMTU receive packet from the destination network device to the source network device, the PMTU receive packet including a received PMTU value;
- updating a PMTU table on the source network device with the received PMTU value included in the PMTU receive packet; and
- resending the data packet when the received PMTU value is below the initial PMTU value.

15. The method of claim 14, further comprising:
- receiving the PMTU send packet at an intermediate network device;
- resizing the PMTU send packet so that the PMTU send packet is as small or smaller than an MTU of a next link to create a resized PMTU send packet; and
- transmitting the resized PMTU send packet to the destination network device as the PMTU send packet.

16. The method of claim 14, further comprising:
- adding a PMTU header to the PMTU send packet, the PMTU header including the initial PMTU value; and
- adding authentication data to the PMTU send packet.

17. The method of claim 14, further comprising:
- including authentication data in the PMTU receive packet before transmitting the PMTU receive packet from the destination network device to the source network device, the authentication data included in the PMTU receive packet corresponding to authentication data included in the PMTU send packet; and
- checking the authentication data included in the PMTU receive packet with the authentication data included in the PMTU send packet.

18. The method of claim 14, further comprising:
- decreasing a size of the PMTU send packet at least once before the PMTU send packet is received at the destination network device.

19. The method of claim 14, further comprising:
- forming a PMTU confirmation packet by adding a PMTU header to a data packet;
- transmitting the PMTU confirmation packet from the source network device to the destination network device periodically;
- transmitting a corresponding PMTU receive packet from the destination network device to the source network device in response to the PMTU confirmation packet.

20. The method of claim 14, further comprising selecting a lowest MTU value from a plurality of received PMTU values received from a plurality of destination network devices associated with a multicast address.

* * * * *